US012165624B2

(12) United States Patent
Narikawa et al.

(10) Patent No.: US 12,165,624 B2
(45) Date of Patent: Dec. 10, 2024

(54) NOISE CANCELING SYSTEM AND NOISE CANCELING METHOD

(71) Applicant: NIPPON TELEGRAPH AND TELEPHONE CORPORATION, Tokyo (JP)

(72) Inventors: Satoshi Narikawa, Musashino (JP); Hiroya Ono, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 116 days.

(21) Appl. No.: 17/925,279

(22) PCT Filed: May 21, 2020

(86) PCT No.: PCT/JP2020/020083
§ 371 (c)(1),
(2) Date: Nov. 14, 2022

(87) PCT Pub. No.: WO2021/234897
PCT Pub. Date: Nov. 25, 2021

(65) Prior Publication Data

US 2023/0178062 A1 Jun. 8, 2023

(51) Int. Cl.
*G10K 11/178* (2006.01)

(52) U.S. Cl.
CPC .. *G10K 11/17823* (2018.01); *G10K 11/17873* (2018.01); *G10K 2210/3027* (2013.01);
(Continued)

(58) Field of Classification Search
CPC ........... G10K 11/178; G10K 11/17823; G10K 11/17873; G10K 11/17881;
(Continued)

(56) References Cited

U.S. PATENT DOCUMENTS

2017/0323630 A1 11/2017 Stickney et al.
2018/0233124 A1 8/2018 Itabashi et al.
2019/0295524 A1 9/2019 Enamito et al.

FOREIGN PATENT DOCUMENTS

GB 2394391 A * 4/2004 ......... G10K 11/1788
JP 201661868 A 4/2016
(Continued)

OTHER PUBLICATIONS

Snyder, Scott D. Active Noise Control Primer. Springer-Verlag, 2000, pp. 91, 92, 119, and 120. (Year: 2000).*
(Continued)

*Primary Examiner* — Kile O Blair
(74) *Attorney, Agent, or Firm* — Harness, Dickey & Pierce, P.L.C.

(57) ABSTRACT

The present disclosure is a noise cancellation system including: a microphone that converts a sound wave into an electrical signal; a transmission line that propagates the electrical signal from the microphone; a speaker that reproduces a sound wave from the electrical signal from the transmission line; a phase inversion circuit that is provided between the microphone and the speaker, and inverses the phase of the electrical signal; a gain adjustment circuit that is provided between the microphone and the speaker, and adjusts a gain for amplifying the electrical signal; and a delay adjustment circuit that is provided between the microphone and the speaker, and adjusts the amount of delay of the electrical signal.

12 Claims, 7 Drawing Sheets

(52) U.S. Cl.
CPC ................ *G10K 2210/3044* (2013.01); *G10K 2210/3046* (2013.01); *G10K 2210/3056* (2013.01)

(58) Field of Classification Search
CPC ... G10K 2210/3027; G10K 2210/3044; G10K 2210/3045; G10K 2210/3046; G10K 2210/3056
See application file for complete search history.

(56) References Cited

FOREIGN PATENT DOCUMENTS

| | | | |
|---|---|---|---|
| JP | 201845088 | A | 3/2018 |
| JP | 2019164263 | A | 9/2019 |

OTHER PUBLICATIONS

Masaharu Nishimura et al., Active Noise Control, Acoustic technology series, Jul. 7, 2006, pp. 4-14.

* cited by examiner

NOISE CANCELING SYSTEM AND NOISE CANCELING METHOD

CROSS-REFERENCE TO RELATED APPLICATIONS

This application is a 371 U.S. National Phase of International Application No. PCT/JP2020/020083, filed on May 21, 2020. The entire disclosures of the above applications are incorporated herein by reference.

TECHNICAL FIELD

The present invention relates to a noise cancellation system and a noise cancellation method for cancelling noise that travels from a noise source.

BACKGROUND ART

There is a noise cancellation technique for reducing ambient noise and create a quiet environment (see NPL 1, for example).

There are two types of noise cancellation techniques: a passive cancellation technique and an active cancellation technique. The passive cancellation technique is a method of reducing noise by covering the human ears with ear pads or the like to physically block out an external sound.

The active cancellation technique is a method of reducing noise by physically generating cancellation sound with the antiphase of noise that travels from a noise source, and canceling out the noise from the noise source with the generated cancellation sound. The active cancellation technique is more effective in reducing noise than the passive cancellation technique.

An overview of the conventional active cancellation technique is shown in FIG. 1. In FIG. 1, 51 indicates a noise source, and 52 indicates a cancellation sound source. In response to the noise from the noise source 51, the cancellation sound source 52 generates cancellation sound that is in antiphase with the noise. In the listener's ears, the noise and the cancelation sound are in antiphase with each other, and the noise can be cancelled out.

A configuration of a cancellation sound source that is used in the conventional active cancellation technique is shown in FIG. 2. In FIG. 2, 61 indicates a microphone, 62 indicates a phase inversion circuit, 63 indicates a gain adjustment circuit, and 64 indicates a speaker. The microphone 61 converts a sound wave, which are noise, into an electrical signal. The phase inversion circuit 62 inverts the phase of the electrical signal. The gain adjustment circuit 63 adjusts the gain for amplifying the electrical signal. The speaker 64 reproduces a sound wave from the electrical signal. The reproduced sound wave cancels out the noise as a cancelation sound.

CITATION LIST

Non Patent Literature

[NPL 1] "Shin Ban Akutibu Kontororu", Acoustic Technology Series, Corona Publishing, pp. 4-14, 2006.

SUMMARY OF THE INVENTION

Technical Problem

However, a cancellation sound source requires signal processing time from the time the microphone converts the sound wave, which is noise, into an electrical signal to the time the speaker reproduces a sound wave serving as cancellation sound. The problem in the conventional cancellation technique is illustrated in FIG. 3. FIGS. 3 (*a*) and 3 (*b*) illustrate how noise is cancelled out in a case in which noise that travels from a noise source is in a low frequency range and in a case in which noise that travels from a noise source is in a high frequency range, respectively. In FIGS. 3, 51 indicates a noise source, 52 indicates a cancellation sound source, 53 indicates a human, 54 indicates a human ear, and Td indicates a signal processing time at the cancellation sound source.

The cancellation sound from the cancellation sound source is delayed by Td than the noise from the noise source due to the signal processing time Td. As shown in FIG. 3 (*a*), when the noise from the noise source is in the low frequency range, the signal processing time Td is sufficiently shorter than one wavelength of the noise, and even if there is the signal processing time Td, it does not have a significant impact on the cancellation sound cancelling out the noise.

However, when the noise from the noise source is in the high frequency range, the signal processing time Td is non-negligible compared to one wavelength of the noise. When the wavelength of the noise in the high frequency is approximately ½ of the signal processing time Td, on the contrary, the cancellation sound multiplies the noise.

Therefore, the present disclosure aims to provide a noise cancellation technique that is effective not only for noise in a low frequency range, but also for noise in a high frequency range.

Means for Solving the Problem

An overview of a cancellation technique according to the present disclosure is shown in FIG. 4. In FIG. 4, 11 indicates a noise source, 12 indicates a cancellation sound source, and 13 indicates a microphone. The microphone 13 and the cancellation sound source 12 are connected by a transmission line.

The noise from the noise source 11 propagates through the air as a sound wave. The microphone 13 is provided in the vicinity of the noise source 11, and takes in noise and converts it into an electrical signal. The converted electrical signal is propagated through the transmission line. The cancellation sound source 12 inverts the phase of the electrical signal, adjusts the gain for amplifying the electrical signal, adjusts the delay of the electrical signal, and reproduces a sound wave from the electrical signal. The reproduced sound wave cancels out the noise as a cancelation sound.

The electrical signal has a faster propagation speed than the sound wave, and even when there is a signal processing time at the cancellation sound source 12, if the signal processing time is smaller than the difference between the arrival time of the electrical signal and the sound wave, the delay of the electrical signal can be adjusted to cancel not only noise in a low frequency range, but also noise in a high frequency range.

To achieve the above-described aim, the present disclosure specifically provides a noise cancellation system including:

- a microphone that converts a sound wave into an electrical signal;
- a transmission line that propagates the electrical signal from the microphone;
- a speaker that reproduces a sound wave from the electrical signal from the transmission line;

a phase inversion circuit that is provided between the microphone and the speaker, and inverses the phase of the electrical signal;

a gain adjustment circuit that is provided between the microphone and the speaker, and adjusts a gain for amplifying the electrical signal; and a delay adjustment circuit that is provided between the microphone and the speaker, and adjusts the amount of delay of the electrical signal.

To achieve the above-described aim, the present disclosure specifically provides a noise cancellation method including:

taking in noise that travels from a noise source, and converting the noise into an electrical signal, using a microphone that is provided in the vicinity of the noise source;

propagating the converted electrical signal through a transmission line; and when reproducing cancellation sound from the propagated electrical signal, using a speaker, at a position between the microphone and the speaker, inverting the phase of the electrical signal so that the phase of the cancellation sound reproduced by the speaker is in antiphase with the phase of the noise from the noise source, at a position of the speaker;

adjusting a gain for amplifying the electrical signal so that the volume of the cancellation sound reproduced by the speaker is the same as the volume of the noise from the noise source heard at the position of the speaker; and adjusting the amount of delay of the electrical signal so that a reproduction delay time from when noise is generated at the noise source to when the cancellation sound is reproduced by the speaker equals a propagation delay time of the sound wave propagating from the noise source to the speaker.

Effects of the Invention

According to the present disclosure, it is possible to provide a noise cancellation technique that is effective not only for noise in a low frequency range, but also for noise in a high frequency range.

DESCRIPTION OF EMBODIMENTS

Hereinafter, embodiments of the present disclosure will be described in detail with reference to the drawings. Note that the present disclosure is not limited to the embodiments described below. These implementation examples are merely illustrative, and the present disclosure can be implemented in various modified and improved forms based on the knowledge of those skilled in the art. In the present specification and the drawings, the components with the same reference signs are the same as each other.

Embodiment 1

Figure 1:
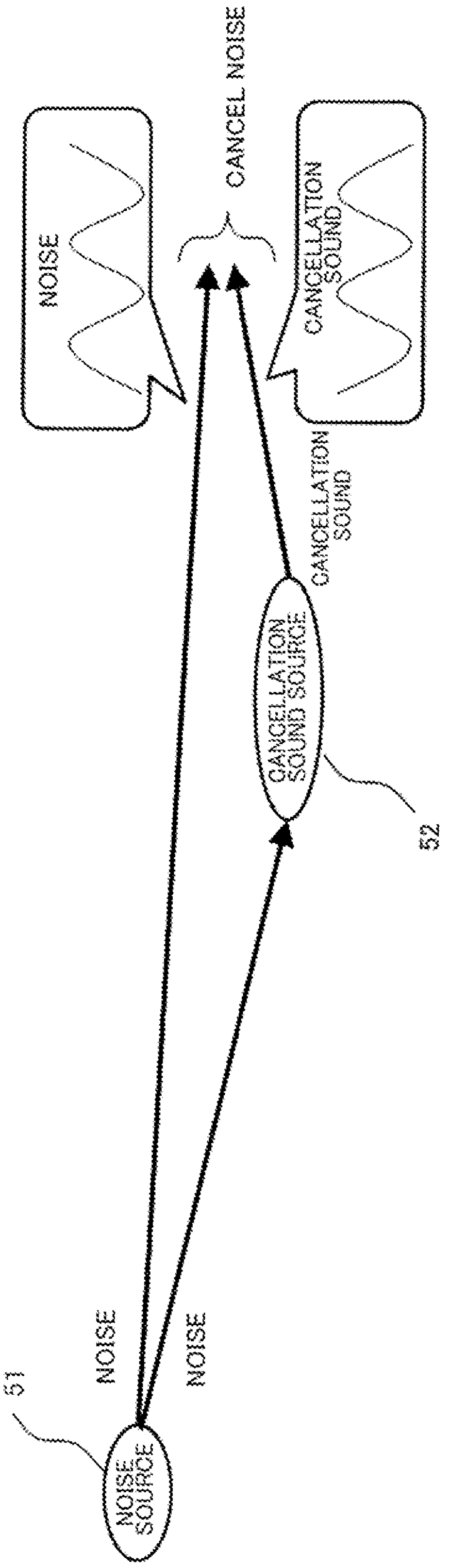
FIG. 1 shows an overview of a conventional active cancellation technique.
Figure 2:
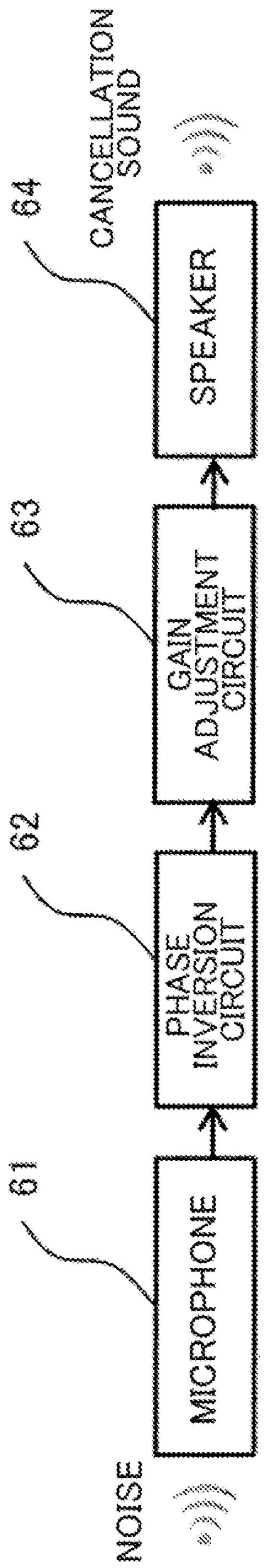
FIG. 2 shows an example of a configuration of a conventional cancellation sound source.
Figure 3:
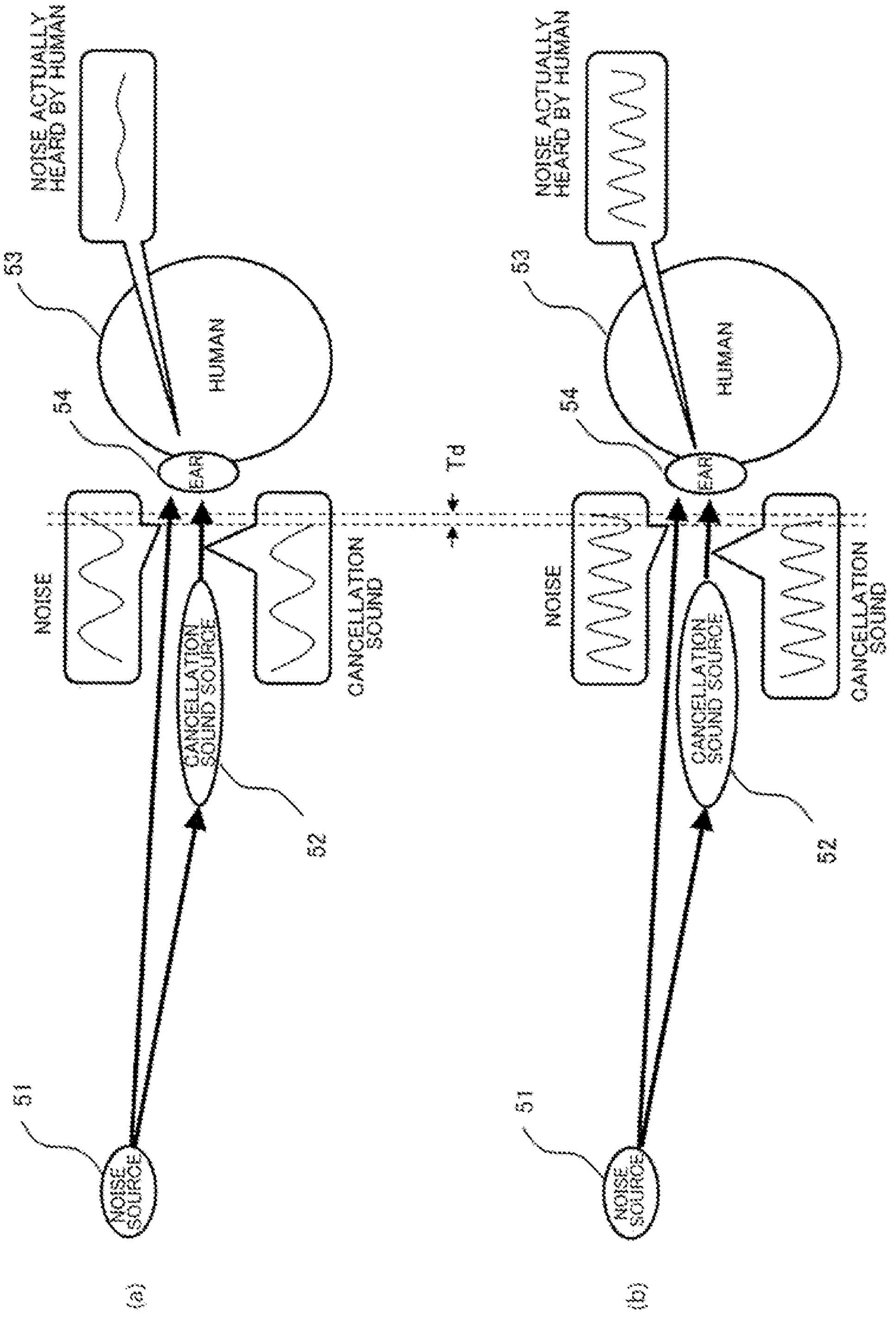
FIG. 3 shows a problem in the conventional cancellation technique.
Figure 4:
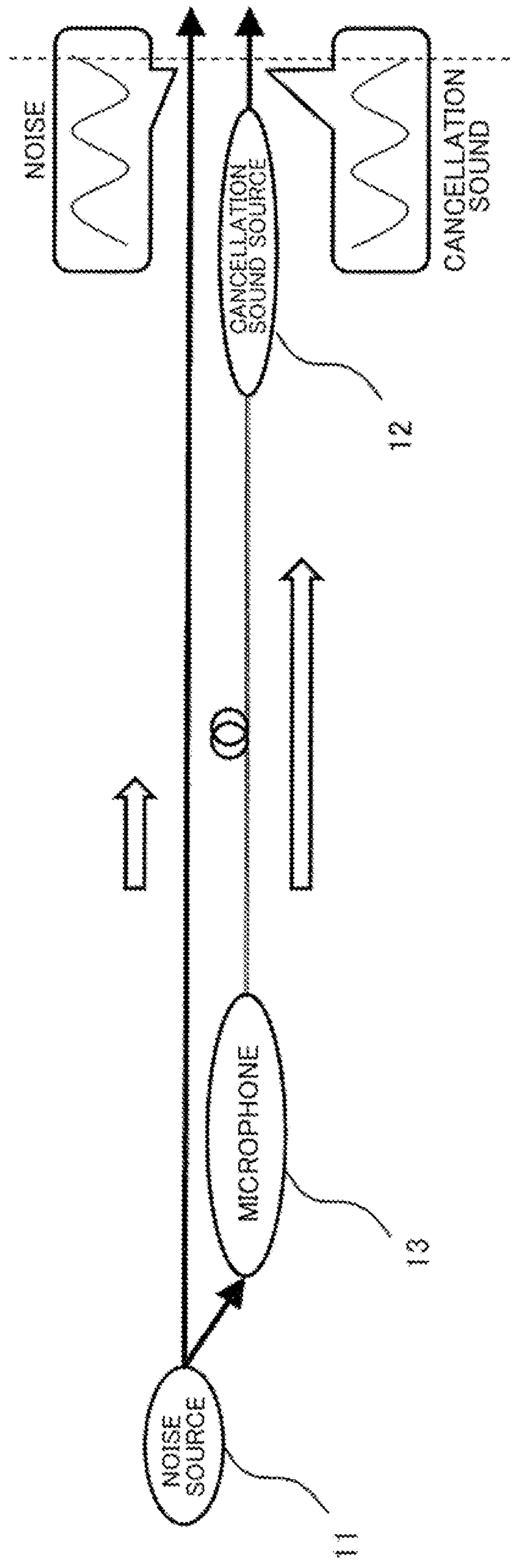
FIG. 4 shows an overview of a cancellation technique according to the present disclosure.
Figure 5:
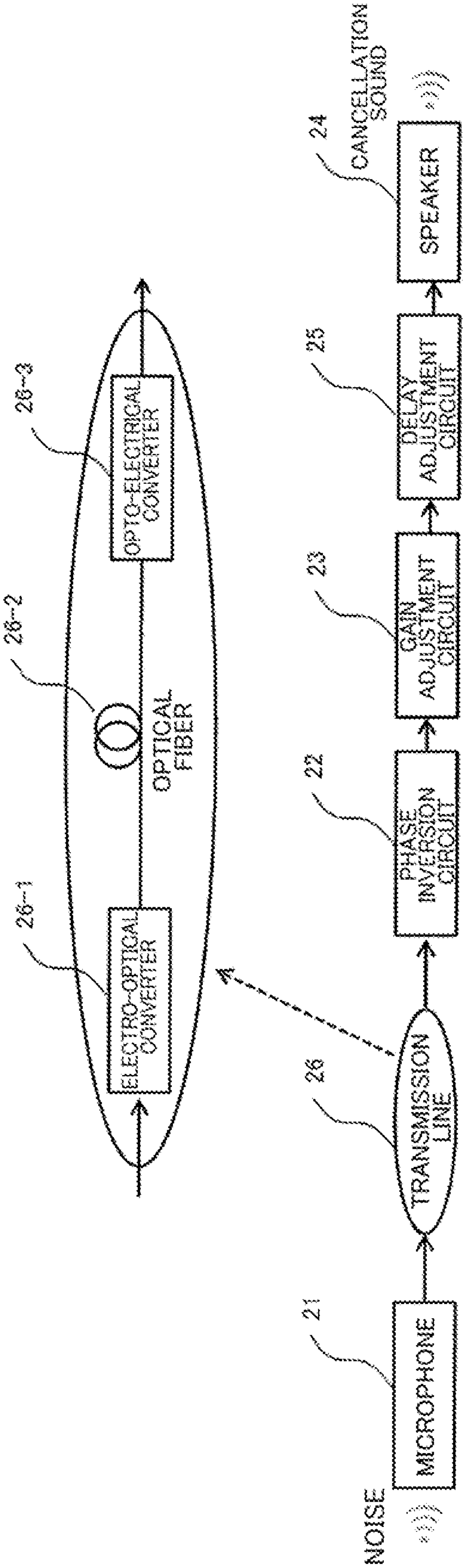
FIG. 5 shows an example of a configuration of a noise cancellation system according to the present disclosure.

FIG. 5 shows an example of a configuration of a noise cancellation system according to the present disclosure. In FIG. 5, 21 indicates a microphone, 22 indicates a phase inversion circuit, 23 indicates a gain adjustment circuit, 24 indicates a speaker, 25 indicates a delay adjustment circuit, 26 indicates a transmission line, 26-1 indicates an electro-optical converter, 26-2 indicates an optical fiber, and 26-3 indicates an opto-electrical converter.

In FIG. 5, the microphone 21 converts a sound wave into an electrical signal. The transmission line 26 propagates the electrical signal from the microphone 21. The phase inversion circuit 22 inverts the phase of the electrical signal. The gain adjustment circuit 23 adjusts the gain for amplifying the electrical signal. The delay adjustment circuit 25 adjusts the amount of delay of the electrical signal. The speaker 24 reproduces a sound wave from the electrical signal. It is only necessary that circuits that realize the functions of the phase inversion circuit 22, the gain adjustment circuit 23, and the delay adjustment circuit 25 are provided between the microphone 21 and the speaker 24. There is no limitation on the order in which the phase inversion circuit 22, the gain adjustment circuit 23, and the delay adjustment circuit 25 are arranged. These functions need not necessarily have to be realized by a single circuit, and may be realized by providing an amplifier circuit with a phase inversion function, a gain adjustment function, and a delay adjustment function.

The transmission line 26 can propagate the electrical signal from the microphone 21 faster than sound waves. The transmission line 26 may be a metallic line or an optical fiber transmission line as shown in FIG. 5. When the transmission line 26 is an optical fiber transmission line, an electro-optical converter 26-1 that converts electrical signals into optical signals and an opto-electrical converter 26-3 that converts optical signals into electrical signals are provided at both ends of the optical fiber 26-2. The transmission line 26 is not limited to being a wired line, and may be a wireless transmission line that uses radio waves. The same applies to the embodiments below.

The functions of the phase inversion circuit 22, the gain adjustment circuit 23, and the delay adjustment circuit 25 may be realized using analog processing, or digital signal processing (DSP). In the case of digital signal processing, an AD converter that converts analog signals to digital signals is inserted in the input stage of digital signal processing, and a DA converter that converts digital signals to analog signals is inserted in the output stage of digital signal processing, and the above functions are realized using digital signal processing. The transmission line 26 may also realize digital transmission instead of analog transmission. The same applies to the embodiments below.

The microphone 21 is provided in the vicinity of the noise source, and takes in the noise from the noise source and converts it into an electrical signal. The converted electrical signal is propagated through the transmission line 26. The phase inversion circuit 22 inverts the phase of the electrical signal so that the phase of the cancellation sound reproduced by the speaker 24 is in antiphase with the phase of the noise from the noise source, at the position of the speaker 24. The gain adjustment circuit 23 adjusts the gain for amplifying the electrical signal so that the volume of the cancellation sound reproduced by the speaker 24 equals the volume of the noise from the noise source heard at the position of the speaker 24. The delay adjustment circuit 25 adjusts the amount of delay of the electrical signal so that the reproduction delay time from when noise is generated at the noise source to when the cancellation sound is reproduced by the speaker 24 equals the propagation delay time of the sound wave propagating from the noise source to the speaker 24. The speaker 24 reproduces the electrical signal as cancellation sound.

The sound wave of the reproduced cancelation sound is in antiphase with the sound wave of the noise, and is of the same magnitude as the sound wave of the noise. Therefore, the cancellation sound interferes with the noise and cancels out the noise.

The microphone 21 may be provided at any position as long as it can take in the noise from the noise source. From the viewpoint of securing signal processing time, using the difference in propagation speed between electromagnetic waves and sound waves, it is preferable that the microphone 21 is close to the noise source. Headphones or earphones may be provided as the speaker 24. If headphones or earphones are provided as the speaker 24, the sound source of the cancellation sound is close to the human ears, making it easier for the gain adjustment circuit 23 to perform gain adjustment and for the delay adjustment circuit 25 to perform delay adjustment. The same applies to the embodiments below.

Therefore, with the noise cancellation system and the noise cancellation method according to the present disclosure, it is possible to provide a noise cancellation technique that is effective not only for noise in a low frequency range, but also for noise in a high frequency range.

Embodiment 2

Figure 6:
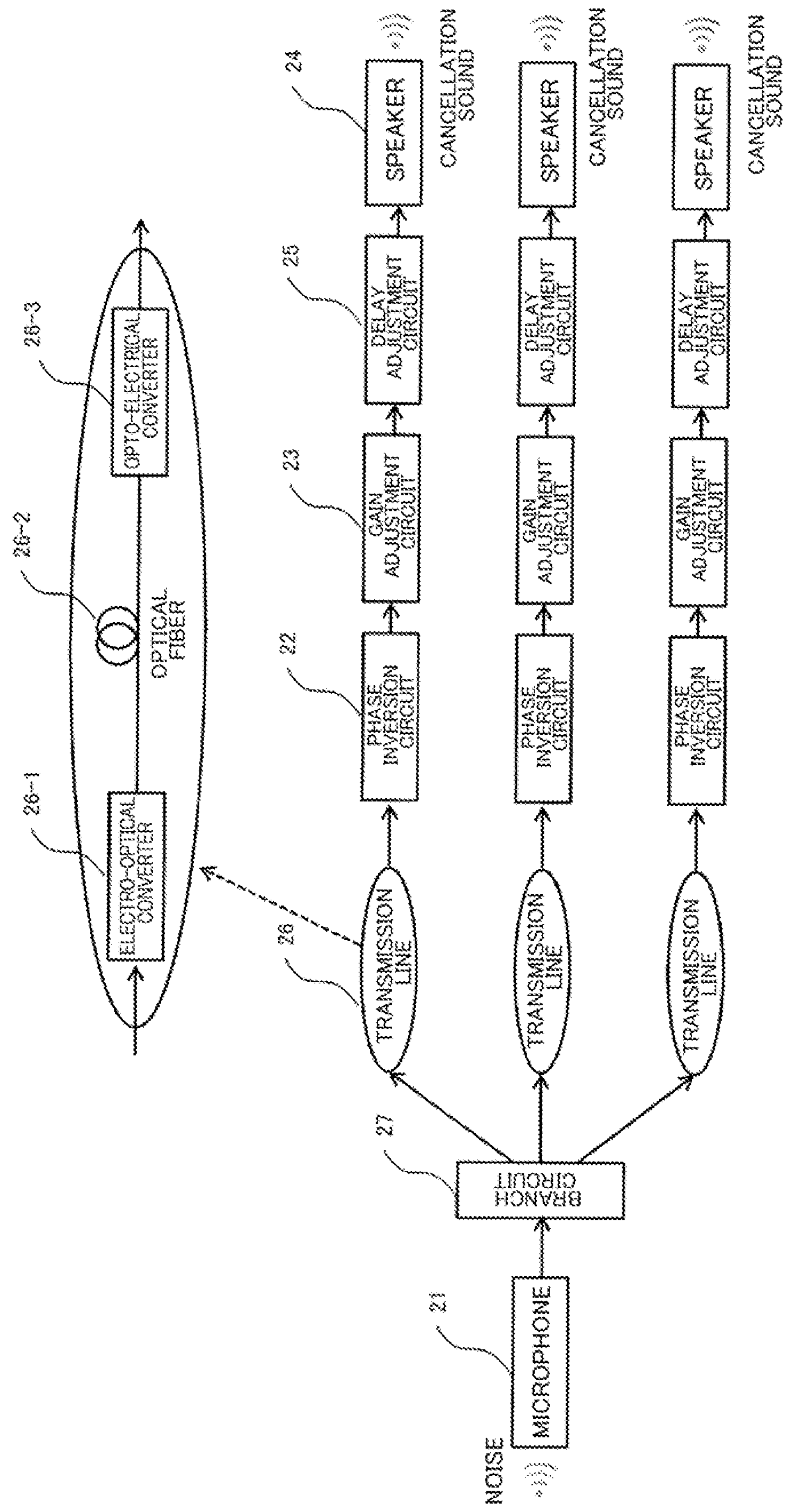
FIG. 6 shows an example of a configuration of the noise cancellation system according to the present disclosure.

FIG. 6 shows an example of a configuration of a noise cancellation system according to the present disclosure. In FIG. 6, 21 indicates a microphone, 22 indicates a phase inversion circuit, 23 indicates a gain adjustment circuit, 24 indicates a speaker, 25 indicates a delay adjustment circuit, 26 indicates a transmission line, 26-1 indicates an electro-optical converter, 26-2 indicates an optical fiber, 26-3 indicates an opto-electrical converter, and 27 indicates a branch circuit.

The difference from Embodiment 1 is that the branch circuit 27 is provided to cancel the noise from the noise source, in a plurality of locations.

In FIG. 6, the microphone 21 converts a sound wave into an electrical signal. The branch circuit 27 branches the electrical signal from the microphone 21. Each transmission line 26 propagates the electrical signal from the branch circuit 27. Each phase inversion circuit 22 inverts the phase of the electrical signal. Each gain adjustment circuit 23 adjusts the gain for amplifying the electrical signal. Each delay adjustment circuit 25 adjusts the amount of delay of the electrical signal. Each speaker 24 reproduces a sound wave from the electrical signal. It is only necessary that circuits that realize the functions of the phase inversion circuits 22, the gain adjustment circuits 23, and the delay adjustment circuits 25 are provided between the branch circuit 27 and the speakers 24. There is no limitation on the order in which the phase inversion circuits 22, the gain adjustment circuits 23, and the delay adjustment circuits 25 are arranged. These functions need not necessarily have to be realized by a single circuit, and may be realized by providing an amplifier circuit with a phase inversion function and a gain adjustment function.

A phase inversion circuit 22 may be provided between the microphone 21 and the branch circuit 27. If a phase inversion circuit 22 is provided between the microphone 21 and the branch circuit 27, this function need only be provided in one location.

The transmission lines 26 are the same as the transmission line 26 in Embodiment 1.

The microphone 21 is provided in the vicinity of the noise source, and takes in the noise from the noise source and converts it into an electrical signal. The branch circuit 27 branches the converted electrical signal into a plurality of electrical signals. The branched electrical signals are respectively propagated through the plurality of transmission lines 26. The phase inversion circuits 22 invert the phases of the electrical signals so that the phase of the cancellation sound reproduced by each speaker 24 is in antiphase with the phase of the noise from the noise source, at the positions of the speakers 24. The gain adjustment circuits 23 adjust the gains for amplifying the electrical signals so that the volumes of the cancellation sound reproduced by the speakers 24 equal the volume of the noise from the noise source heard at the positions of the speakers 24. The delay adjustment circuits 25 respectively adjust the amounts of delay of the electrical signals so that the reproduction delay time from when noise is generated at the noise source to when the cancellation sound is reproduced by the speakers 24 equals the propagation delay time of the sound wave propagating from the noise source to the speakers 24. Each of the plurality of speakers 24 reproduces the electrical signal as cancellation sound.

If a phase inversion circuit 22 is provided between the microphone 21 and the branch circuit 27, the phase inversion circuit 22 inverts the phase of the electrical signal from the microphone 21 so that the phase of the cancellation sound reproduced by each speaker 24 is in antiphase with the phase of the noise from the noise source, at the positions of the speakers 24.

Therefore, with the noise cancellation system and the noise cancellation method according to the present disclosure, it is possible to provide a noise cancellation technique that is effective not only for noise in a low frequency range, but also for noise in a high frequency range.

Furthermore, it is possible to cancel the noise from a noise source, in a plurality of locations.

Embodiment 3

Figure 7:
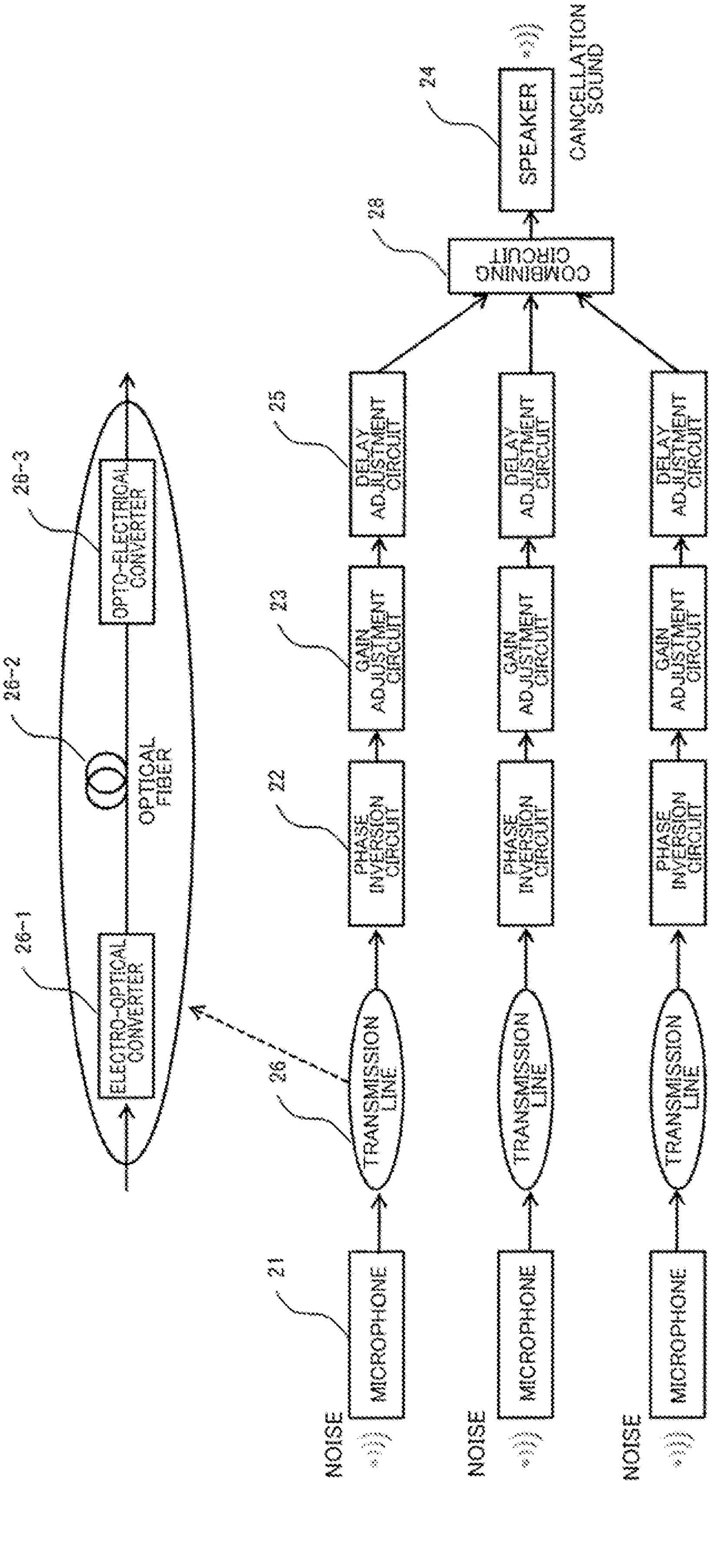
FIG. 7 shows an example of a configuration of the noise cancellation system according to the present disclosure.

FIG. 7 shows an example of a configuration of a noise cancellation system according to the present disclosure. In FIG. 7, 21 indicates a microphone, 22 indicates a phase inversion circuit, 23 indicates a gain adjustment circuit, 24 indicates a speaker, 25 indicates a delay adjustment circuit, 26 indicates a transmission line, 26-1 indicates an electro-optical converter, 26-2 indicates an optical fiber, 26-3 indicates an opto-electrical converter, and 28 indicates a combination circuit.

The difference from Embodiment 1 is that the combining circuit 28 is provided to cancel the noise from the noise sources provided in a plurality of locations.

In FIG. 7, each microphone 21 converts a sound wave into an electrical signal. Each transmission line 26 propagates the electrical signal from the microphone 21. Each phase inversion circuit 22 inverts the phase of the electrical signal. Each gain adjustment circuit 23 adjusts the gain for amplifying the electrical signal. Each delay adjustment circuit 25 adjusts the amount of delay of the electrical signal. The combining circuit 28 combines the electrical signals. The speaker 24 reproduces a sound wave from the electrical signal. It is only necessary that circuits that realize the functions of the phase inversion circuits 22, the gain adjustment circuits 23, and the delay adjustment circuits 25 are provided between the microphone 21 and the combining circuit 28. There is no limitation on the order in which the phase inversion circuits 22, the gain adjustment circuits 23, and the delay adjustment circuits 25 are arranged. These functions need not necessarily have to be realized by a single circuit, and may be realized by providing an amplifier circuit with a phase inversion function, a gain adjustment function, and a delay adjustment function.

The phase inversion circuits 22 may be provided between the combining circuit 28 and the speaker 24. If the phase inversion circuits 22 are provided between the combining circuit 28 and the speaker 24, this function need only be provided in one location.

The transmission lines 26 are the same as the transmission line 26 in Embodiment 1.

The microphones 21 are respectively provided in the vicinities of the plurality of noise sources, and takes in the noise from the noise sources and converts it into electrical signals. The converted electrical signals are respectively propagated through the transmission lines 26. The phase inversion circuits 22 invert the phases of the electrical signals so that the phase of the cancellation sound reproduced by the speaker 24 is in antiphase with the phase of the noise from the noise source, at the position of the speaker 24. The gain adjustment circuits 23 adjust the gains for amplifying the electrical signals so that the volume of the cancellation sound reproduced by the speaker 24 equals the volume of the noise from the noise sources heard at the position of the speaker 24. The delay adjustment circuits 25 respectively adjust the amounts of delay of the electrical signals so that the reproduction delay time from when noise is generated at the noise sources to when the cancellation sound is reproduced by the speaker 24 equals the propagation delay time of the sound waves propagating from the noise sources to the speaker 24. The combining circuit 28 combines the electrical signals. The plurality of speakers 24 reproduce the combined electrical signal as cancellation sound.

If a phase inversion circuit 22 is provided between the combining circuit 28 and the speaker 24, the phase inversion circuit 22 inverts the phases of the electrical signals from the microphones 21 so that the phase of the cancellation sound reproduced by the speaker 24 is in antiphase with the phase of the noise from the noise sources, at the position of the speaker 24.

Therefore, with the noise cancellation system and the noise cancellation method according to the present disclosure, it is possible to provide a noise cancellation technique that is effective not only for noise in a low frequency range, but also for noise in a high frequency range.

Furthermore, it is possible to cancel the noise from noise sources provided in a plurality of locations.

INDUSTRIAL APPLICABILITY

The present disclosure is appliable to the information and communications industry.

REFERENCE SIGNS LIST

11 Noise source
12 Cancellation sound source
13 Microphone
21 Microphone
22 Phase inversion circuit
23 Gain adjustment circuit
24 Speaker
25 Delay adjustment circuit
26 Transmission line
26-1 Electro-optical converter
26-2 Optical fiber
26-3 Opto-electrical converter
27 Branch circuit
28 Combining circuit
51 Noise source
52 Cancellation sound source
53 Human
54 Human ear
61 Microphone
62 Phase inversion circuit
63 Gain adjustment circuit
64 Speaker
Td Signal processing time at cancellation sound source

The invention claimed is:

1. A noise cancellation system comprising:
a microphone that converts a sound wave from a noise source into an electrical signal;
a transmission line that propagates the electrical signal from the microphone;
a speaker that reproduces a sound wave from the electrical signal from the transmission line;
a phase inversion circuit that is provided between the microphone and the speaker, and inverses the phase of the electrical signal;
a gain adjustment circuit that is provided between the microphone and the speaker, and adjusts a gain for amplifying the electrical signal; and
a delay adjustment circuit that is provided between the microphone and the speaker, and operates to delay the electrical signal by an amount equal to propagation time of a sound wave from the noise source to the speaker.

2. The noise cancellation system of claim 1, wherein the transmission line is a wireless transmission line.

3. The noise cancellation system of claim 1, further comprising an amplifier circuit configured to realize the functions of the phase inversion circuit, the gain adjustment circuit, and the delay adjustment circuit.

4. The noise cancellation system of claim 1, further comprising an AD converter that is provided in an input stage of digital signal processing and a DA converter that is provided in the output stage of digital signal processing.

5. A noise cancellation system comprising:
a microphone that converts a sound wave from a noise source into an electrical signal;
a branch circuit that branches the electrical signal from the microphone;
a plurality of transmission lines that respectively propagate electrical signals transmitted from the branch circuit;
a plurality of speakers that respectively reproduce sound waves from the electrical signals from the transmission lines;
a phase inversion circuit that is provided between the microphone and the branch circuit, and inverts the phase of the electrical signal, or a plurality of phase inversion circuits that are provided between the branch circuit and the speakers, and respectively invert the phases of the electrical signals, a plurality of gain adjustment circuits that are provided between the branch circuit and the speakers, and respectively adjust gains for amplifying the electrical signals; and a plurality of delay adjustment circuits that are provided between the branch circuit and the speakers, and respectively operate to delay the electrical signals by amounts equal to propagation time of a sound wave from the noise source to the speakers.

6. The noise cancellation system of claim 5, wherein the transmission lines are wireless transmission lines.

7. The noise cancellation system of claim 5, further comprising an amplifier circuit configured to realize the functions of the phase inversion circuit, the gain adjustment circuit, and the delay adjustment circuit.

8. The noise cancellation system of claim 5, further comprising an AD converter that is provided in an input stage of digital signal processing and a DA converter that is provided in the output stage of digital signal processing.

9. A noise cancellation system comprising:

a plurality of microphones that convert sound waves from noise sources into electrical signals;

a plurality of transmission lines that respectively propagate the electrical signals from the microphones;

a combining circuit that combines the electrical signals from the plurality of transmission lines;

a speaker that reproduces a sound wave from an electrical signal transmitted from the combining circuit;

a phase inversion circuit that is provided between the combining circuit and the speaker, and inverts the phase of the electrical signal, or a plurality of phase inversion circuits that are provided between the microphones and the combining circuit, and respectively invert the phases of the electrical signals, a plurality of gain adjustment circuits that are provided between the microphones and the combining circuit, and respectively adjust gains for amplifying the electrical signals; and a plurality of delay adjustment circuits that are provided between the microphones and the combining circuit, and respectively operate to delay the electrical signals by amounts equal to propagation time of sound waves from the noise sources to the speaker.

10. The noise cancellation system of claim 9, wherein the transmission lines are wireless transmission lines.

11. The noise cancellation system of claim 9, further comprising an amplifier circuit configured to realize the functions of the phase inversion circuit, the gain adjustment circuit, and the delay adjustment circuit.

12. The noise cancellation system of claim 9, further comprising an AD converter that is provided in an input stage of digital signal processing and a DA converter that is provided in the output stage of digital signal processing.

* * * * *